United States Patent [19]

Lazan, Jr.

[11] 4,380,131
[45] Apr. 19, 1983

[54] FISH LINE HOOK SETTING ATTACHMENT
[76] Inventor: Frank Lazan, Jr., Box 311, Cassville, W. Va. 26527
[21] Appl. No.: 216,849
[22] Filed: Dec. 16, 1980
[51] Int. Cl.³ .............................................. A01K 97/12
[52] U.S. Cl. ........................................ 43/15; 43/43.13
[58] Field of Search ...................... 43/15, 43.13, 43.1, 43/42.49, 42.19, 42.2

[56] References Cited
U.S. PATENT DOCUMENTS

D. 152,295 10/1947 Simun .................................. 43/42.19
D. 227,249 6/1973 Harris ................................... 43/42.19
3,693,275 9/1972 Craig ........................................ 43/15

FOREIGN PATENT DOCUMENTS 407479 3/1934 United Kingdom ................. 43/42.2

Primary Examiner—Nicholas P. Godici
Assistant Examiner—M. Jordan
Attorney, Agent, or Firm—Harvey B. Jacobson

[57] ABSTRACT

A fishing line assembly is provided including a flexible base end portion for support from a support structure such as a fishing rod, a flexible free end portion from one end of which a hook assembly may be supported and an elongated intermediate portion extending between and connecting the base end portion and the second end of the free end portion. The intermediate portion includes structure functioning to rigidify the intermediate portion and further includes opposite end oppositely inclined transverse vane members supported therefrom, whereby a pull on the hook assembly supported from the free end portion as a result of a fish biting on the hook assembly will cause lengthwise displacement of the intermediate portion and the resultant movement of the vane members through the water will cause the intermediate portion to be inclined relative to the direction of the pull on the free end portion of the fishing line assembly and thus resist the pull and thereby render the effect of an almost immediate pull on the end of the free end portion remote from the hook assembly in a direction substantially opposite to the direction of the pull effected by the biting fish.

7 Claims, 4 Drawing Figures

FISH LINE HOOK SETTING ATTACHMENT

BACKGROUND OF THE INVENTION

When still fishing either with or without a bobber, in most instances it is desirable for a fisherman to effect a pull on his fishing line in a direction opposite to the direction in which a fish pulls on the free end of the fishing line in order that the hook assembly supported by the fishing line free end may be properly "set" against dislodgement from the mouth of the fish. While there have been various forms of fishing line attachments expressly designed to have the effect the desired pull by the fisherman in an automatic manner as soon as a fish exerts a pull on the free end of the fishing line, most of these attachments are cumbersome to use, or are complex in nature and are not constructed in a manner whereby the associated fishing line may be cast. Further, other forms of fishing line pull effecting structures are specifically designed for use only when ice fishing. Accordingly, a need exists for an apparatus whereby the pull effected by a fish biting on the hook assembly carried by the free end of a fishing line may be substantially immediately opposed by the effect of a pull on the opposite end of the fishing line. Further, a need exists whereby even a light but gradual pull on the free end of the fishing line by a fish biting on the associated hook assembly may be opposed by a force having the effect of a light pull on the opposite end of the fishing line in the opposite direction.

Examples of previously known forms of fishing attachments including some of the general structural and operational features of the instant invention are disclosed in U.S. Pat. Nos. 2,782,548, 2,808,673, 2,979,848 and 4,141,168. However, these previously known forms of fishing line attachments are not suited for casting operations and are not sensitive to light but continuous pulls effected on the associated fishing lines by fish biting on the corresponding hook assemblies.

BRIEF DESCRIPTION OF THE INVENTION

The attachment of the instant invention comprises an elongated structure to be securely connected in a fishing line between the base and free end portions thereof and includes longitudially spaced oppositely inclined water vanes whereby a pull on the free end of the associated fishing line will have the effect of longitudinally displacing the attachment through the water and the water vanes thereon will cause the attachment to be angulated relative to the direction of the pull and thus have the effect of the exertion of the pull on the base end of the fishing line in the opposite direction to the pull effected by a fish biting on the fishing line hook assembly.

The attachment may actually comprise an intermediate portion of the fishing line assembly serially connected between the base and free end portions of the fishing line assembly, or the attachment may comprise an elongated member attached at its opposite ends to adjacent fishing line portions, whereby the attachment will be merely connected in parallel to the existing intermediate portion of the fishing line.

The main object of this invention is to provide a fishing line assembly attachment which will have the effect of an almost immediate pull on the base end of a fishing line as a result of a fish biting and pulling on a hook assembly supported from the free end of the fishing line.

Another object of this invention is to provide a fishing line attachment in accordance with the preceding object and which may be used at any substantially any depth.

Yet another object of this invention is to provide a fishing line attachment in accordance with the preceding objects and which may be cast over great distances.

Another important object of this invention is to provide a fishing line attachment which may be utilized in conjunction with a bobber supported from the associated fishing line at a point spaced thereabove.

A final object of this invention to be specifically enumerated herein is to provide a fishing line attachment in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
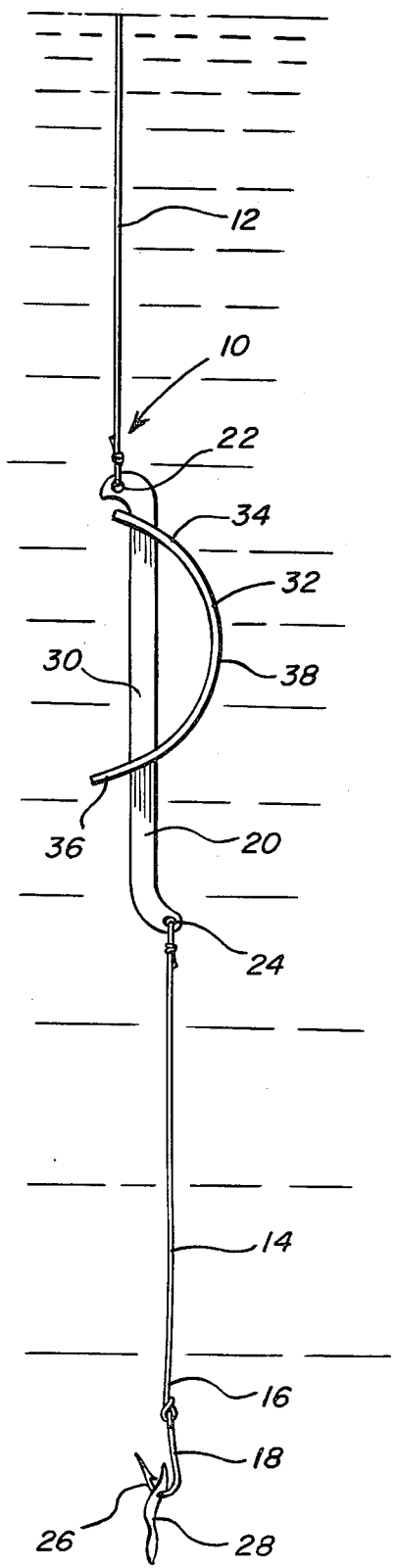
FIG. 1 is an elevational view of the fishing line attachment of the instant invention shown connected in series relative to the base and free end portion of the associated fishing line.

Referring now more specifically to the drawings, the numeral 10 generally designates a fish line assembly including an elongated flexible base end portion 12 for support from a suitable support structure, such as a fishing rod (not shown), an elongated flexible free end portion 14 from one end 16 of which a hook assembly 18 is supported and an elongated rigid intermediate portion 20. The intermediate portion includes opposite end apertures 22 and 24 through which the adjacent ends of the end portions 12 and 14 are secured and it will be noted from FIG. 1 of the drawings that the hook assembly 18 comprises a single hook 26 suitably baited as at 28.

The intermediate portion 20 comprises an elongated flat bar member 30 in which the opposite end apertures 22 and 24 are formed. The bar member 30 includes a water vane structure 32 supported therefrom including a pair of opposite end vane defining portions 34 and 36 interconnected by an integral bowed intermediate portion 38. The water vane structure 32 comprises a triangular shaped panel 40 of transparent material bowed along its height into the configuration illustrated in FIGS. 1, 2 and 3.

The upper apex portion 42 of the panel 40 includes a vertically elongated rectangular slot 44 formed therein and the lower base portion of the triangular panel includes a second vertically elongated rectangular slot 48 formed therein. The slots 44 and 48 are substantially longitudinally aligned.

Figure 2:
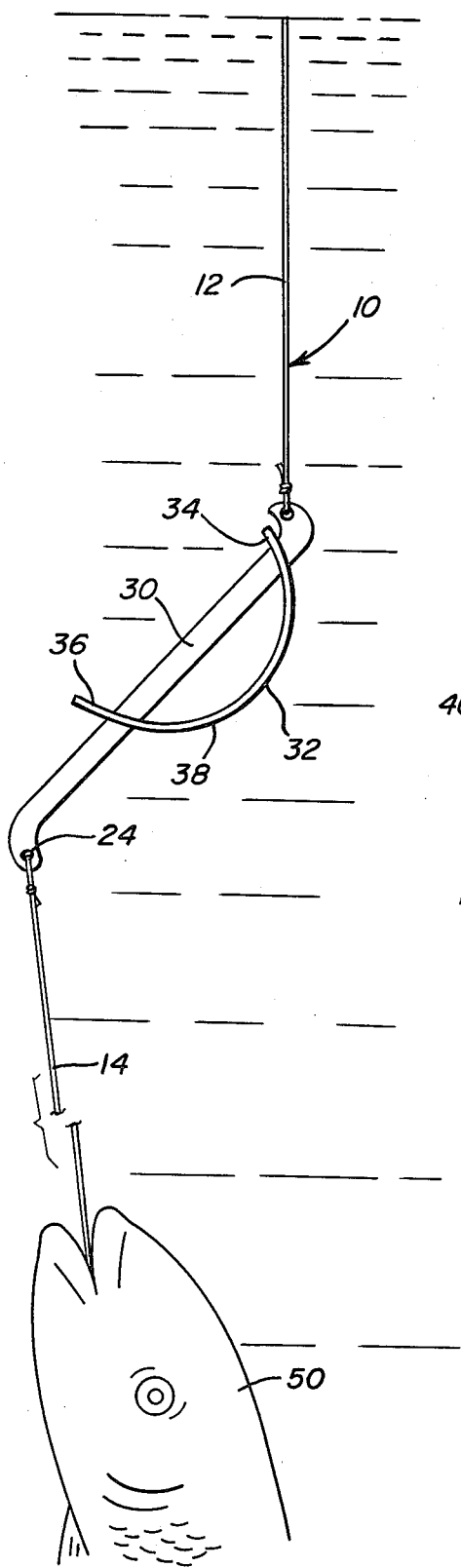
FIG. 2 is an elevational view illustrating the manner in which a downward pull on the free end of the fishing line by a fish will have the effect of causing the attachment to be inclined relative to the direction of the pull.
Figure 3:
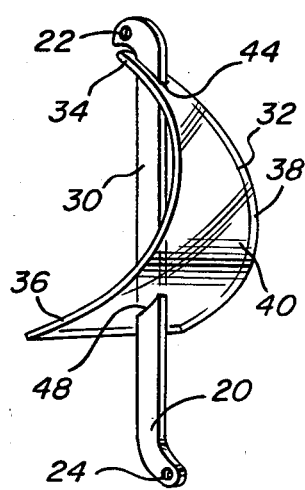
FIG. 3 is a perspective view of the attachment.
Figure 4:
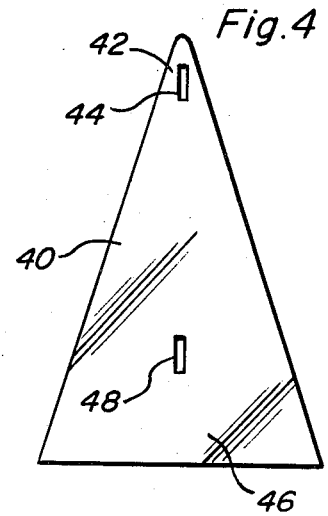
FIG. 4 is a plan view of the water vane portion of the attachment.

The panel 40 is constructed of somewhat resilient transparent material and may be bowed into the bowed condition thereof illustrated in FIGS. 1, 2 and 3 of the drawings. In order to apply the panel 40 to the member 30, the upper curved end of the member 30 may be threaded through the upper slot 44 and the panel 40 may then be slid downwardly to a point with the slot 44 disposed at approximately the longitudinal midportion of the bar 30. Thereafter, the panel portion 40 is bowed into the general shape thereof illustrated in FIGS. 1, 2 and 3 of the drawings and the lower curved end of the bar member 30 is inserted through the slot 48. Then, with sufficient pressure being applied to the upper apex portion 42 and the base portion 46 to urge the latter toward each other against the inherent biasing action of the panel 40, the water vane structure 32 may be slid upwardly along the bar member 30 to the position thereof illustrated in FIG. 1 of the drawings.

In operation, when a fish, such as fish 50, bites the hook 26 and pulls downwardly on the free end portion 14, the water vane structure 32 is pulled downwardly through the water and the oppositely inclined vane defining portions 34 and 36 cause the bar member 30 to be angulated toward the position thereof illustrated in FIG. 2 of the drawings, whereby the water vane structure exerts resistance to the downwardly movement to the free end portion 14, thus simulating an upward pull on the free end portion 14 of the fishing line assembly 10. Although the fish hook end of the free end portion 14 does in fact move downwardly through the ambient water, the angulation of the bar member 30 toward the position thereof illustrated in FIG. 2 of the drawings reduces the depth to which the free end portion 14 of the fishing line assembly 10 would be pulled if the water vane structure was not provided. Accordingly, immediately after the fish 50 bites the hook 26 and pulls downwardly on the free end portion 14, the effect of an upward pull on the fishing line assembly 10 is created by the angulation of the bar member 30 toward the position thereof illustrated in FIG. 2 of the drawings. Inasmuch as this angulation of the bar member 30 occurs substantially at the same time the free end portion 14 is pulled downwardly by the fish, proper "setting" of the fish hook 26 in the mouth of the fish 50 is substantially assured.

Although the bar member 30 is serially connected in the fish line assembly 10 between the base end portion 12 and the free end portion 14, the fish line assembly 10 could comprise a one-piece line with a section thereof extending between and integral with the base end portion 12 and the free end portion 14. In such a modification, the opposite end portions of the intermediate portion of the line extending between the end portions 12 and 14 could be suitably anchored to the opposite ends of the bar member 30.

The bar member 30 may also be constructed of transparent material such as plastic and, therefore, the entire attachment comprising the water vane structure 32 and the bar member 30 will be substantially invisible in water.

The attachment may be utilized in conjunction with a fishing line being used in "still fishing" and may also be used independent of or in conjunction with a bobber attached to the upper base end portion 12 of the fish line assembly 10. Still further, the attachment may be made of such weight to enable it to be useful in assisting long casts of the fish line assembly 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a fishing line assembly including a flexible base end portion for support from a support structure such as a fishing rod, a flexible free end portion from one end of which a hook assembly may be supported and an elongated intermediate portion extending between and connecting said end portions, said intermediate portion including means functioning to rigidify said intermediate portion, the opposite ends of said intermediate portion including oppositely inclined transverse water vane portions supported therefrom against rotation relative to said intermediate portion, whereby a downward pull on the free end portion of the fishing line assembly by a fish biting on the attached hook assembly sufficient to cause lengthwise downward displacement of the fishing line assembly against light buoyancy applied thereto by an associated bobber will cause said intermediate portion to be inclined relative to the direction of the pull and thus resist said pull at the free end portion of said fishing line assembly to thereby render the effect of an almost immediate pull on the free end portion of the fishing line assembly in a direction substantially opposite to the direction of the pull effected thereon by a fish.

2. The combination of claim 1 wherein said intermediate portion comprises an elongated rigid member to whose opposite ends the adjacent ends of said base and free end portions are secured.

3. The combination of claim 2 wherein said rigid member and said water vane portions are constructed of transparend material.

4. In combination with a fishing line assembly including a flexible base end portion for support from a support structure such as a fishing rod, a flexible free end portion from one end of which a hook assembly may be supported and an elongated intermediate portion extending between and connecting said end portions, said intermediate portion including means functioning to rigidify said intermediate portion, the opposite ends of said intermediate portion including oppositely inclined transverse water vane portions supported therefrom, whereby a downward pull on the free end portion of the fishing line assembly by a fish biting on the attached hook assembly sufficient to cause lengthwise downward displacement of the fishing line assembly against light buoyancy applied thereto by an assoiated bobber will cause said intermediate portion to be inclined relative to the direction of the pull and thus resist said pull at the free end portion of said fishing line assembly to thereby render the effect of an almost immediate pull on the free end portion of the fishing line assembly in a direction substantially opposite to the direction of the pull effected thereon by a fish, said intermediate portion comprising an elongated rigid member to whose opposite ends the adjacent ends of said base and free end portions are secured, said rigid member and said water vane portions being constructed of transparent material, said water vane portions comprising opposite ends of an elongated bowed panel member whose opposite ends are anchored relative to corresponding ends of said rigid member.

5. The combination of claim 4 wherein said panel member includes opposite end openings formed therethrough which the opposite ends of said rigid member are inserted and slidably received.

6. The combination of claim 5 wherein said elongated panel member is constructed of stiff but resilient material.

7. The combination of claim 6 wherein said panel member is of generally triangular plan shape with the upper apex portion of said panel member receiving the upper end of said rigid member therethrough.

* * * * *